United States Patent

Harris

(10) Patent No.: US 8,427,275 B1
(45) Date of Patent: *Apr. 23, 2013

(54) AUTOLOCATION OF GRAY GOODS

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,529

(22) Filed: Jul. 24, 2012

Related U.S. Application Data

(63) Continuation of application No. 13/330,918, filed on Dec. 20, 2011, now Pat. No. 8,228,207, which is a continuation of application No. 12/025,017, filed on Feb. 2, 2008, now Pat. No. 8,081,084.

(51) Int. Cl.
*G05B 19/00* (2006.01)
(52) U.S. Cl.
USPC ............................ 340/5.1; 340/686.1; 340/5.8
(58) Field of Classification Search .................. 340/5.1, 340/5.8, 686.1
See application file for complete search history.

(56) References Cited

U.S. PATENT DOCUMENTS

| | | | |
|---|---|---|---|
| 5,790,074 A | 8/1998 | Rangedahl | |
| 6,204,772 B1 * | 3/2001 | DeMay et al. | 340/686.1 |
| 7,212,828 B2 * | 5/2007 | Hind et al | 455/456.1 |
| 7,327,250 B2 * | 2/2008 | Harvey | 340/539.13 |
| 7,453,355 B2 * | 11/2008 | Bergstrom et al. | 340/539.13 |
| 8,081,084 B2 * | 12/2011 | Harris | 340/686.1 |
| 8,144,725 B2 | 3/2012 | Bienas | |
| 8,228,207 B2 * | 7/2012 | Harris | 340/686.1 |
| 2005/0101383 A1 | 5/2005 | Wells | |
| 2005/0108096 A1 | 5/2005 | Burger | |
| 2005/0210101 A1 * | 9/2005 | Janik | 709/203 |
| 2005/0246098 A1 * | 11/2005 | Bergstrom et al. | 701/213 |
| 2009/0015372 A1 | 1/2009 | Kady | |

\* cited by examiner

*Primary Examiner* — Travis Hunnings
(74) *Attorney, Agent, or Firm* — Law Office of Scott C. Harris, Inc.

(57) ABSTRACT

A device is allowed to be used only in a specified location. The device has an automatic location detection part, and automatically determines its location, and whether that location is authorized. If unauthorized, or if no location detection signal is detected for too long a time, the device is deactivated.

17 Claims, 1 Drawing Sheet

AUTOLOCATION OF GRAY GOODS

CROSS-REFERENCE OF RELATED APPLICATION

This application is a continuation application of U.S. Ser. No. 13/330,918 filed Dec. 20, 2011, now U.S. Pat. No. 8,228,207 issued Jul. 24, 2012, which is a continuation application of U.S. Ser. No. 12/025,017 filed Feb. 2, 2008, now U.S. Pat. No. 8,081,084 issued Dec. 20, 2011 and entitled "Autolocation of Gray Goods", the disclosure of which is hereby incorporated by reference, in its entirety.

BACKGROUND

Goods may be separately licensed for use in different jurisdictions. For example, a Prada™ purse may be made specifically for the Mexican market. This purse may be slightly different than the US version, and may be sold for a different price. However once the item is sold, it is difficult to keep it from entering another jurisdiction.

Gray goods are goods that are licensed for use only in a certain jurisdiction, but then used in another different jurisdiction. This has become a difficult problem with clothing and furnishings such as purses and other designer goods. It is also a problem with electronic items.

SUMMARY

The present application teaches a system and method of automatically enforcing jurisdictional limits on electronic devices.

An embodiment describes obtaining a wireless signal in an electronic device, and using that wireless signal to determine a jurisdiction, and if the device is licensed for use in that jurisdiction.

Figure 1:
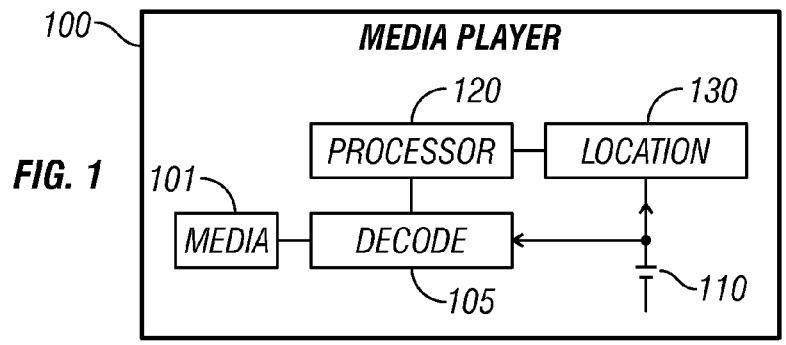
FIG. 1 shows an electronic device with a location detection chip.

An embodiment shown in FIG. 1. An electronic item, such as a media player 100 is shown. This electronic item requires electrical energization, e.g., electric power or battery power, in order to operate properly. Battery 110 is shown providing that power. The media player receives media 101, and decodes that media using decoder 105 to play the media. The media player may be an MP3 player such as an ipod, or may be a DVD or BlueRay type player, a television or digital video recorder, or any other kind of player. The item also includes an internal processor 120 that controls its actions, and also includes a location detector part 130. For example, the location detector may be a GPS device, or may be a wireless communication detector as described herein. It may alternatively be any other detector that automatically detects information indicative of location and/or position.

In one embodiment, the detector 130 is a global positioning device that may detect a location of the unit by reference to GPS satellites.

A GPS device, however, requires a clear view of the sky. Many devices like this are often used indoors, and will never get a good GPS fix.

In another embodiment, this system receives information wirelessly over an information receiving channel. The embodiments describe different ways of doing this.

An embodiment is a cellular phone detector. For example, this may use a multiple format cellular phone receiver that receives many of the different common cellular telephone transmissions. The receiver may receive any or all of GSM, GPRS, CDMA, TDMA, JIS, WAP, or any others. The receiver does not need to decode the telephone transmissions it receives—it only needs to recognize what they are and a carrier code indicative of their origin.

This can be, for example, a single, multifunction, chip that receives multiple different cell phone transmissions. The chip investigates periodically, for example once a day while operating, to investigate incoming cellular signals. As an alternative, the chip might only look at signals on startup, under the assumption that once the electronic device is started in an authorized jurisdiction, it may be difficult or impractical to move the electronic device to another jurisdiction without restarting it. For many media players, they are left energized all the time—and may never need to get another position fix after the first one (other than for power failures or moving the device). An antenna or other device can be used to facilitate getting that position fix in those rare circumstances where one needs to be obtained.

In the cellular embodiment, once receiving a cellular signal, the cellular signal is analyzed to determine information indicative of the carrier that produced that signal, without looking at the content of the communication it carries. For example, the content may include a carrier number or other information indicative of the carrier that is providing the content. The cellular information may be received from the carrier itself, or from a cellular phone that is transmitting.

Figure 2:
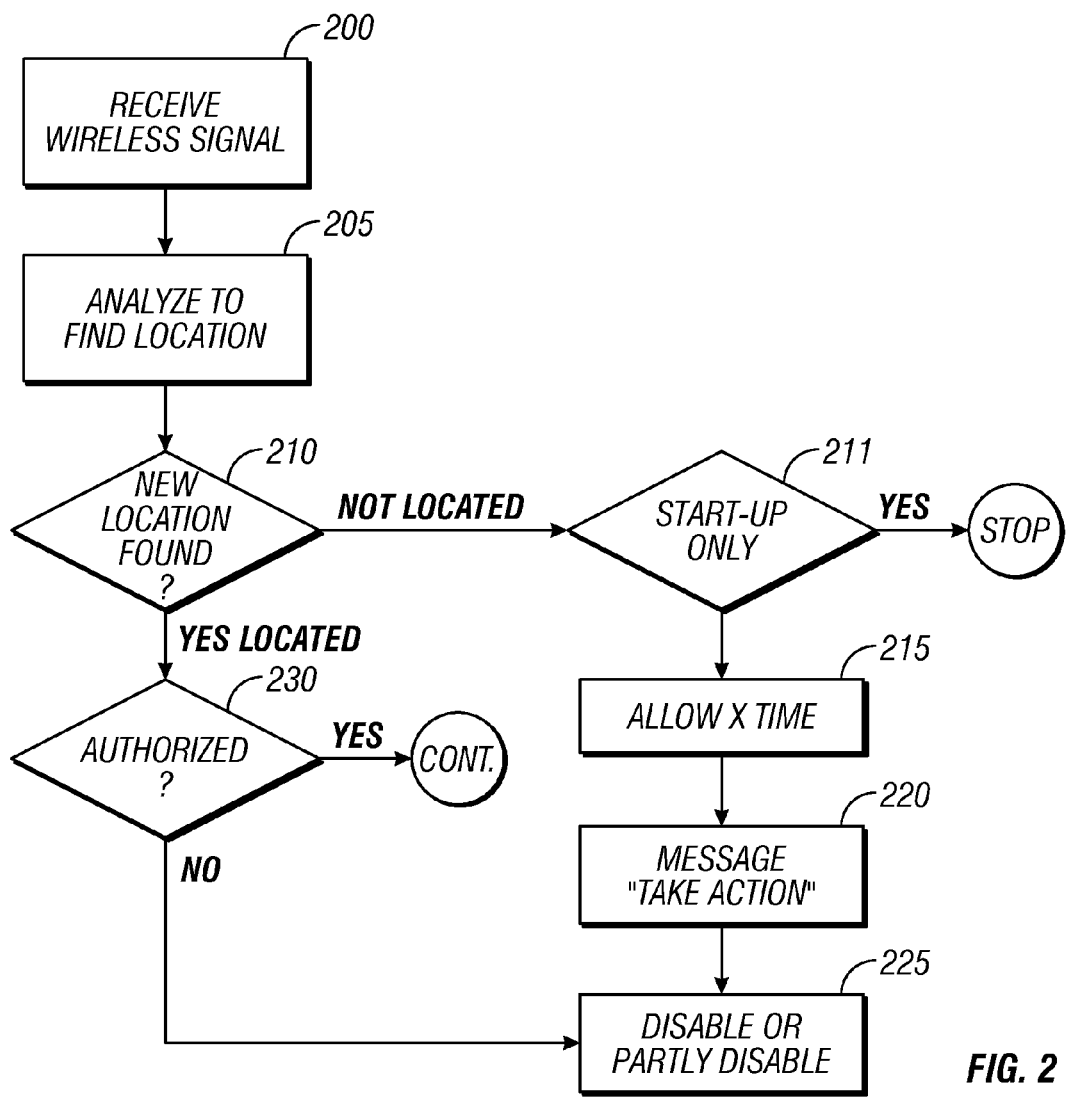
FIG. 2 illustrates a flowchart of operation.

The processor may store a list of all carrier information for all cellular carriers in the world. Based on receiving this information, the processor looks up the appropriate information within its list, and determines its actual location. The processor then executes the flowchart of FIG. 2.

This flowchart operates by receiving the wireless signal at 200. The wireless signal is analyzed at 205 to determine some information about the location.

If no location is found at 210, this may mean that the device is outside cellular range. A startup only mode is tested at 211, and if not active, for example, the system may allow x-time to find a location at 215. After the x-time has expired, however, the system may display or enunciate a message indicating that either the user needs to get a view of the sky (for GPS), or the unit needs to be unblocked to detect cellular signals, or some other action needs to be taken at 220. This prompts the operator to move the device to a place where the unit can receive information. Messages indicative of the failure to receive proper information can be received, for example. A message, for example, may be displayed, for example, saying "you have 24 hours to receive a fix".

If no automatic location information has been received for some specified period of time, e.g 7 days, the electronic device may be disabled or partly disabled at 225 until such information is received. The partial disable may allow only certain kinds of functionality, for example, but still allows the unit to operate. This may completely stop the electronic device, or it may stop only a part of the device, or one particular function of the device, or only for a specified time.

If a location is found at 210, the system determines whether the electronic device is in an authorized location at 230. For example, if the device is authorized for use in the United States only, and a United States cellular carrier is found, the processor determines an authorized location. If so, the process continues. If not, flow passes to 225 which disables or partly disables the unit.

An advantage of this system is that the device can, with relatively simply receiving structure, automatically enforce jurisdictional limits on its location. This system can be used in televisions, media players such as ipods or dvd players, cameras, or in any other device that has an electrical component or powering system, and can have a special chip inserted. Portable devices, e.g. cameras, may be more usable with GPS determination, since devices of this type may be taken outside at times, e.g. to be carried to a location.

Other ways of determining the location can be used. For example, the unit may receive cordless phone transmissions, and carry out caller ID on those transmissions to determine the telephone number, and from that telephone number, determine the country.

Another embodiment may receive wireless radio or television transmissions, and analyze information within those transmissions to determine the country of origin.

More generally, other embodiments may receive information wirelessly over an information receiving channel. Examples of the wireless information receiving channel given above include cellular transmissions, wireless telephone, radio or television, but receptions over other wireless receiving channels may also be encompassed. For example, other radio channels, such as time or weather, or others are encompassed.

This embodiment can also be used with clothing or furniture, by attaching a theft-deterrent device to the clothing/furniture. The theft deterrent device is a large tag that is attached to the clothing. The device has a battery operation to allow it to receive wireless information and determine its location. Removal of the device is allowed only when proper location detection information is automatically detected.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices besides media players are intended to be encompassed; anything that has a source of power, such as lights, printers, computers, network appliances, home appliances, and virtually any others can be used in this way.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The communicator described herein may include any kind of computer, either general purpose, or some specific purpose computer such as a workstation. The computer may be an Intel (e.g., Pentium or Core 2 duo) or AMD based computer, running Windows XP or Linux, or may be a Macintosh computer.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. An apparatus, comprising:
an electronic device, connectable to be powered from a source of power and operable to carry out an operation that uses said source of power for said operation;
a wireless receiver which receives first wireless information of a first type; and
a processor, operating on initial power up of the electronic device to analyze said first wireless information, to determine location information indicative of a location of said electronic device from said first wireless information, and to store said location information;
said processor controlling whether or not said electronic part is enabled to carry out said operation, said processor determining if said location information indicative of said location has been obtained and stored, and preventing said electronic part from carrying out said operation if said location has not been obtained and stored, and allowing said electronic part to continue carrying out said operation once said location has been obtained and stored.

2. The apparatus as in claim 1, wherein said processor controls said electronic part to continue carrying out said operation after said location information has been obtained and stored, even if said at least one electronic part is moved to a different location than a location where said location information was obtained.

3. The apparatus as in claim 1, wherein said processor operates to determine said location information indicative of said location only on initial power up the device, and does not again analyze said location information after said initial power up of the device.

4. The apparatus as in claim 1, wherein said first wireless information is cellular information, and said apparatus determine said location information from said cellular information.

5. The apparatus as in claim 1, wherein said processor allows carrying out said operation by comparing said location with an authorized location for use of the electronic part to determine if the apparatus is operating in said authorized location and to prevent said electronic part from carrying out said function when said comparing indicates that said location is not said authorized location.

6. The apparatus as in claim 1, wherein said processor operates for determining if said location information has been obtained and stored within a predetermined period of time, and preventing said apparatus from carrying out said first operation when said location information has not been obtained and stored within said predetermined period of time.

7. The apparatus as in claim 1, wherein said electronic device carries out multiple operations, but none of the multiple operations carried out by said electronic device uses said location information.

8. An apparatus, comprising:
an electronic device operable to carry out a first operation;
said electronic device including a wireless receiver which receives first wireless information of a first type;

a processor, operating to analyze said first wireless information, to determine location information indicative of a location of said electronic device from said first wireless information, and to store said location information;

said processor controlling whether or not said electronic device is enabled carry out said first operation, said processor determining if said location has been determined and stored within a predetermined period of time, and preventing said apparatus from carrying out said first operation when said location has not been determined and stored within said predetermined period of time.

9. The apparatus as in claim 8, wherein said processor operates for allowing said electronic device to continue carrying out said first operation once said location has been obtained and stored, when said moved to a different location than said location at which said location information was determined and stored.

10. The apparatus as in claim 8, wherein said processor operates for determining if said location has been determined and stored within a predetermined period of time after initial power up of the electronic device, and preventing said apparatus from carrying out said first operation when said location has not been obtained and stored within said predetermined period of time after initial power up of the electronic device.

11. The apparatus as in claim 10, wherein processor only operates for obtaining and storing said location on initial power up the device, and does not again analyze said location information after said initial power up of the device.

12. The apparatus as in claim 10, wherein said first wireless information is cellular information, and said apparatus determines said location information from said cellular information.

13. The apparatus as in claim 10, wherein said processor controls carrying out said first operation by comparing said location with an authorized location for use of the electronic part to determine if the apparatus is operating in an authorized location and to prevent said electronic part from carrying out said function when said comparing indicates that said location is not an authorized location.

14. The apparatus as in claim 10, wherein said electronic device carries out multiple operations, but none of the multiple operations carried out by said electronic device uses said location information.

15. An apparatus, comprising:
an electronic device, connectable to be powered from a source of power and operable to play electronic media under control of said user;
said electronic device including a wireless receiver which receives first wireless information of a first type;
an antenna for receiving said first wireless information, connected to said wireless receiver;
a processor, operating to analyze said first information, to determine location information indicative of a location of said electronic device from said first wireless information, and to store said location information,
said processor controlling whether or not said electronic device can operate to play said electronic media based on whether said location has not been obtained and stored,
wherein said processor controls said device not to carry out any operation under control of the user that uses said location information.

16. The apparatus as in claim 15, wherein said processor determines if said location has been found within a predetermined period of time, and prevents said apparatus from carrying out said first operation when said location has not been found within said predetermined period of time.

17. The apparatus as in claim 15, wherein said processor determines if said location has been found within a predetermined period of time after startup, and prevents said apparatus from carrying out said first operation when said location has not been found within said predetermined period of time after startup.

* * * * *